Oct. 13, 1970     G. R. HOSKER ET AL     3,534,348

DIGITAL METER SYSTEM

Filed Jan. 3, 1967     3 Sheets-Sheet 1

INVENTORS
Gerald R. Hosker
Theodore O. Froelich
by McDougall, Hersh, Scott and Ladd
Att'ys

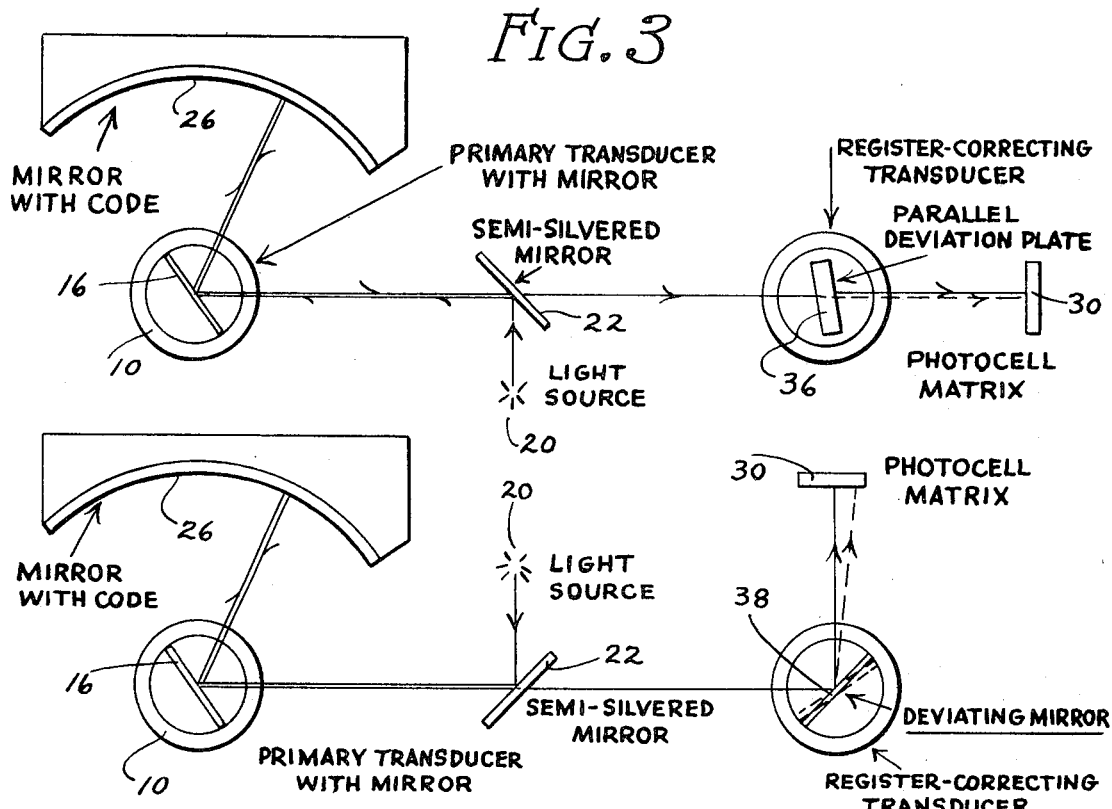
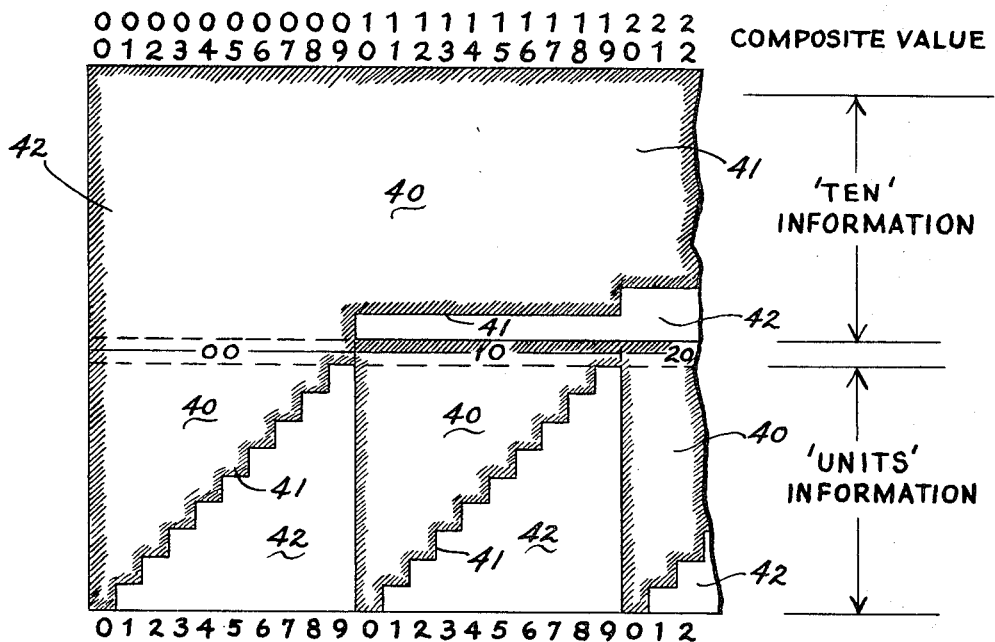

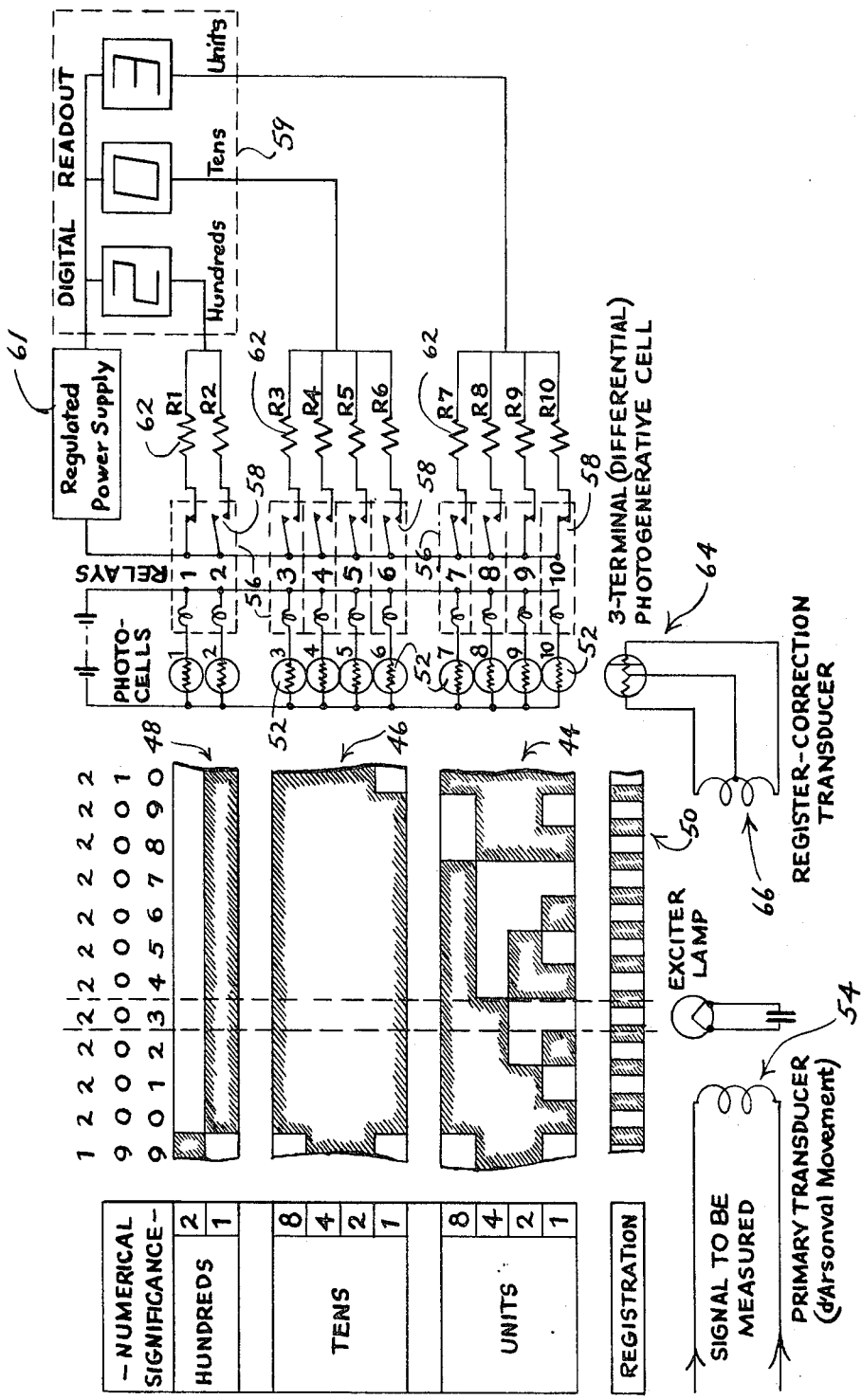

United States Patent Office 3,534,348
Patented Oct. 13, 1970

3,534,348
DIGITAL METER SYSTEM
Gerald Raymond Hosker and Theodore Otto Froelich, London, Ontario, Canada, assignors to American Gage & Machine Company, Chicago, Ill., a corporation of Illinois
Filed Jan. 3, 1967, Ser. No. 607,017
Int. Cl. G08c 19/36
U.S. Cl. 340—190
14 Claims

ABSTRACT OF THE DISCLOSURE

An apparatus for measuring variable conditions of a moveable element including a reflecting means attached to the element for directing light to a coded mirror. The light is reflected back to photo-sensitive means which are connected to digital display means so that digital representations can be produced depending on the position of the moveable element.

This invention relates to a system for use in providing a digital display of information, for example, information being measured by measuring instruments.

It is well known that meter constructions and other devices can be employed for displaying information being measured. In a typical case, a needle will be positioned over a meter face with the needle being attached to a movement which responds to the condition being measured. Anyone viewing the meter can determine the state of the conditions being measured by noting the position of the needle relative to the meter face. An analog presentation of this type is widely used where random variations in the condition being measured are to be expected. For example, where a furnace temperature is being measured, it can be expected that the needle will move back and forth across the scale as the conditions change.

It is often necessary to provide a recording of the information illustrated on constructions of the type referred to. In such instances, an individual can look at the meter and record the value denoted by the needle. The value can then be written on a suitable recording chart.

Procedures which involve recording in the manner described are subject to error. Thus, an operator may well misconstrue the position of the needle on the dial and make a significant error in the figure recorded. Furthermore, it is usually quite difficult to record with a high degree of resolution in the manner described.

It is a general object of this invention to provide a relatively simplified system for providing a digital display of information being measured by instruments normally used for analog presentations whereby the values being measured can be more easily and more accurately employed, for example when the values are to be recorded.

It is a further object of this invention to provide a digital display device which is adapted to automatically operate in conjunction with a measuring means which responds to randomly varying conditions.

It is a more specific object of this invention to provide a structure of the type described which operates in conjunction with mechanisms usually employed for providing an analog presentation and which is adapted to provide virtually instantaneous digital readout of information.

It is a further object of this invention to provide a structure of the type described which is characterized by accuracy and reliability, but which is not particularly complex in structure whereby the system can be produced and maintained at a relatively low cost.

It is a further object of this invention to provide a structure of the type described which is adapted to automatically adjust itself to compensate for inexact registry when recording.

These and other objects of this invention will appear hereinafter and for purposes of illustration, but not of limitation, specific embodiments of the invention are illustrated in the accompanying drawings wherein.

Figure 1:
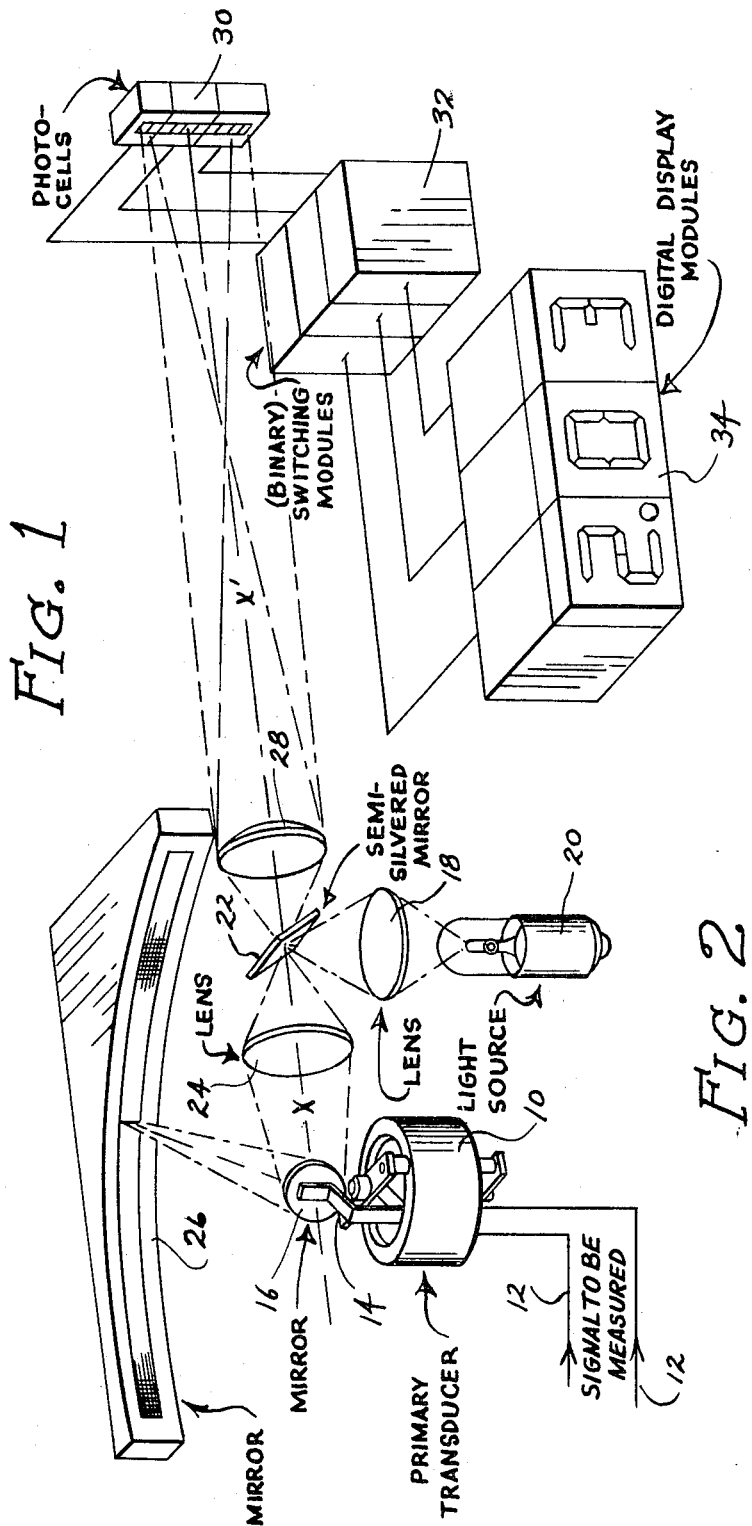
FIG. 1 is a diagrammatic illustration of a system characterized by the features of this invention.

FIGS. 3 and 4 comprise diagrammatic illustrations of alternative means for providing proper registry in the system;

FIG. 5 is a diagrammatic illustration of an alternative coded reflecting means; and, FIG. 6 is a diagrammatic illustration of a circuit arrangement suitable for use in conjunction with the system of this invention.

Both for convenience and because of the importance of such an application, the following description refers mainly to the embodiment of the system in an instrument for measuring electrical signals. It will be evident, however, that the system to be described can be applied to other forms of measuresment where the function being measured is adapted to induce a rotational deflection or other mechanical movement which has a direct relationship to the unknown signal. Thus, for example, the primary transducer might be a diaphragm or Bourdon-tube movement responding to fluid pressure, flow, temperature et cetera. Or the system might be adapted to the measurement of angles or derived functions of angles or to the mathematical processes of an analog computer. In the application of the invention to these and other possible arrangements, the result of the measurement or other process will be displayed digitally, i.e., directly in numerals.

The system of analog signal management allied to digital readout to be described involves "reading" the deflection of an analog-responding measuring device by photoelectric means. This "reading" must be made in such a way that the resulting information can be digested readily by simple circuitry which can generate a numerical or "digital" readout. To make this translation possible, the deflection of a primary transducer is encoded by printing a pattern upon an arc-shaped mirror. This pattern changes progressively by small increments from the point corresponding with zero deflection of the primary transducer up to a point corresponding with full-scale deflection. The number of increments in this code must equal (or must be an integral multiple or sub-multiple of) the total numerical value of the full-scale digital readout. The code must also be arranged to handle the "units," "tens," "hundreds," etc., information in separate groups so that the burden of decimal conversion or "counting" does not fall upon the circuitry required to generate the numerical readout; i.e., the decimal information must remain a function of physical position in the code and in the readout if circuit simplicity is to be retained.

The system preferably uses well-known photocell and digital display devices. In the preferred system, the photocells produce a significant change of electrical signal in response to a change in the illumination falling upon them, and the digital display devices respond to rational changes of electrical input (current or voltage) in the sense that zero electrical input causes the numeral "0" to be displayed, one unit of electrical input causes the numeral "1" to be displayed and so on up to the numeral "9."

The elements of a system embodying the characteristics of this invention are shown in FIG. 1. The signal to be measured or processed is applied to a primary transducer 10 through lines 12. The transducer is shown as a d'Arsonval meter movement which will respond to D.C. electrical signals. The moving arm 14 of this transducer is provided with a mirror 16 whose plane lies in the axis of rotation of the movement. A condensing lens system 18 focusses the emission from a light source 20 upon a fixed inclined semi-silvered mirror 22. The latter is so oriented that the light is reflected to fall, via a lens system 24 upon mirror 16 from which it is reflected to an arc-shaped mirror 26 whose axis of curvature coincides with the axis of rotation of the d'Arsonval movement.

Consideration of the geometry of this optical layout will show that light falling upon the mirror 26 will be reflected back along the same path by which it arrived and will return to impinge upon the semi-silvered mirror 22. Part of this light will penetrate mirror 22 and continue through lens 28 along the axis $X-X^1$ regardless of the angular position assumed by the mirror 16 as determined by the deflection of the transducer 10 in response to the unknown signal applied to it. The only significant limitation applying to this optical layout is that the deflection of the mirror 16 should not go beyond the limits for which efficient reflection can be maintained at its surface.

Further consideration of the geometry of this optical system will show that an image of any pattern printed on the surface of the arc-shaped mirror 26 will be projected along the axis $X-X^1$. It follows therefore that a coded pattern printed on the surface of the mirror 26 could be "read" by a system of photoelectric cells 30 placed at an appropriate focal distance along the axis $X-X^1$. Such a coded pattern can be arranged to change progressively in small increments (commencing at a point corresponding with zero deflection of the d'Arsonval transducer). If the group 30 of photocells is arranged to have a width corresponding with one increment of the printed code, any specific deflection of the transducer will result in selective illumination of certain of the photocells in a grouping which will be significantly related to that deflection. In short, the number and arrangement of illuminated cells in the matrix 30 will be a unique function of the signal to be measured.

Figure 2:
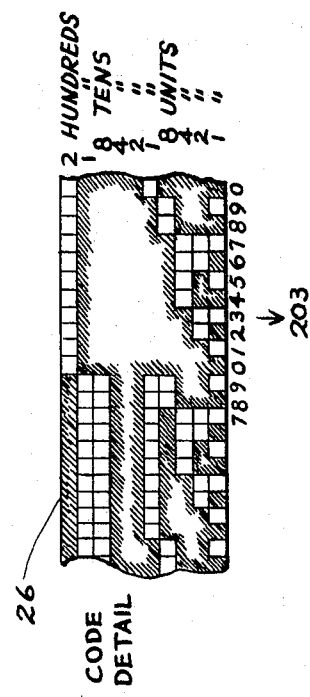
FIG. 2 is a detail view of a coded reflecting means employed in accordance with one form of the invention.

Numerous factors may influence the choice of code to be printed on the arc-shaped mirror 26. Evidently the code must contain a sufficient number of elements to transmit intelligence of the maximum levels of units, tens, hundreds, et cetera, desired in the digital readout. Also, the number of increments along the code must be sufficient to afford the required resolution in the readout. FIG. 2 illustrates an enlarged view of such a code pattern showing the white (reflective) and black (non-reflective) square elements. The pattern shown is the simple BCD code with ten horizontal bands. The lowest four bands provide the "units" information, the next four bands the "tens" information and the top two bands the hundreds information for a readout with three significant figures with a maximum value of 399.

In the BCD code illustrated in FIG. 2, the ten bands are assigned the numerical values of 1, 2, 4, 8, 10, 20, 40, 80, 100, 200, reading from the bottom. By appropriate additions, the lowest four bands can convey the numerals 0–9 for the "units" in the readout. The next four bands will convey the numerals 0–9 for the "tens" and the remaining two bands provide for 0–3 for the "hundreds" in the readout. The resolution of this code is one part in 399 or 0.25 percent providing that this number of elements (in the horizontal direction) corresponds with the total deflection of the d'Arsonval transducer.

All illuminated photocells in the group 30 will have approximately equal outputs, and the magnitude of the response is unimportant in the translation of the coded pattern with the only concern being whether or not a photocell is illuminated. Each photocell is separately connected to a switching circuit 32 so that when it is illuminated, it passes a current corresponding with its assigned numerical value (1, 2, 4 or 8) to the associated section of the digital display device 34. The necessary additions are performed by these switching circuits so that appropriate combinations of illuminated photocells will deliver current values corresponding with the numerals 0–9. Dark photocells will cause zero current to be delivered to the related digital display device.

In general, it cannot be expected that any particular deflection of the d'Arsonval transducer will produce an image which is in exact (horizontal) register with the matrix of photocells. There exists, therefore, a risk that a transition pattern intermediate between two groups of elements in the code, will be "read" by the photocells and a false readout will be obtained. A particular form of the invention contemplates means for eliminating this problem. Specifically, advantage is taken of the fact that the first (lowest) band in the code displayed on the mirror 26 is composed of alternate black and white squares (corresponding with single increments in the "units" in the readout). A part of the signal developed in the corresponding photocell of the group 30 is employed to generate a small amount of feedback which is applied to the deflection coil of the transducer 10 in the appropriate direction to cause it to index in exact register with the code elements of nearest (higher or lower) value. Mathematically, this is equivalent to "rounding-off" a decimal fraction following the last significant digit in the readout. Alternatively, a separate code band and additional photocells could be used for this purpose.

Where it is impractical or undesirable to apply a photoelectrically generated feedback directly to the primary transducer to correct the register of the code pattern projected upon to photocell matrix, one or other of the alternative methods shown in FIGS. 3 and 4 can be employed. In each case an optical element is introduced at an appropriate point in the main optical path between the mirror 22 and the photocells 30. The arrangement is such that angular displacement of the optical element will produce a small lateral displacement of the code image projected upon the photocell matrix. This element is mounted upon the moving member of an electrically responsive mechanism (such as a d'Arsonval, moving-iron or moving-magnet meter movement, etc.), the axis of rotation being parallel to that of the primary transducer. The operating coil of this mechanism is connected to a photocell system (associated with the main matrix 30 of photocells) in such a way that a feedback current will be delivered whenever the code pattern projected upon the matrix is not in exact register. This feedback current causes the optical element to rotate in the appropriate direction to cause a lateral displacement of the projected image just sufficient to correct the error of register. The optical element is so adjusted that when the projected pattern would normally reach the photocell matrix in exact register, there would be no deviation from the normal optical path.

The first method illustrated in FIG. 3 exploits the lateral displacement (refraction) which occurs in a beam of light when it passes through a parallel transparent plate 36 with an angle of incidence other than normal. The deviated beam (solid line) is directed to an auxiliary photocell system which produces feedback currents fed to the movement carrying the plate 36. As the plate 36 is rotated by the photoelectrically generated feedback currents, the code pattern projected upon the photocell matrix 30 is brought into exact register. The amount of this corrective action is predictable since the amount of lateral displacement ($d$) of a light ray passing through a parallel plate of thickness ($t$) and refractive index ($n$) with a small angle of incidence ($i$) radians with respect to normal is:

$$d = t(i - i/n)$$

For a specific point in the optical path, the characteristics of the transparent deviation plate and the sensitivities of the photoelectric feedback system and the deflection mechanism controlling the angular deflection of the plate can be adjusted to provide the exact register required for deviations up to plus or minus one-half of a code element.

The second method illustrated in FIG. 4 is otherwise similar in action to the first but uses a mirror or reflecting prism 38 rather than a parallel plate. As before, photoelectrically generated feedback currents are used to control the attitude of the deviating element to insure exact register of the code pattern projected upon the photocell matrix. In the arrangement illustrated, this displacement produced is angular rather than purely lateral, the reflected beam being deviated through twice the angle which the reflecting device is displaced from its normal position. At the photocell matrix 30, the effect appears as a lateral displacement and correct adjustment of the component sensitivities in relation to the point at which the correcting (reflective) element is introduced into the optical system will assure correct register of the projected code pattern for deviations up to plus or minus one-half of a code element.

A d'Arsonval transducer, if such is employed in the system as the element 10, will have a specific sensitivity. If desired, multiple ranges may be obtained by conventional switching of multipliers, shunts, et cetera. Simultaneously, the position of a decimal point in the readout can be changed by either of the following methods:

(a) separate lamps illuminating as many separate decimal point positions as may be desired can be selectively energized by switches coupled to the range switch.

(b) decimal points (in as many positions as may be desired) may be formed by the exposed ends of lightguides terminating at suitable locations in the digital display. All of these lightguides could derive illumination from the main (or a separate) light source, a shutter on the range switch controlling the admission of light to the guide forming the decimal point in the location required.

It will be seen that the system described in the foregoing paragraphs provides a means for "reading" the deflection of an analog-responding measuring device (such as a d'Arsonval meter movement) and presenting the value of the reading in digital form without the complexity of "quantizing" the signal to be measured and counting quanta up from zero each time a reading is to be made. Because of this essentially analog management of the signal to be measured:

(a) the information for all digits in the readout is developed simultaneously, i.e., derivation of the "tens" information does not have to await completion of counting of the "units" information, and so on;

(b) the system responds equally well to upward and downward changes in the signal to be measured;

(c) the need for complex, high-speed counting circuits is eliminated; and, (d) relatively simple and highly reliable photoelectric and elementary electronic switching circuits can be substituted.

Subject only to the ballistic capability of the transducer and display devices to respond, changes in the value of the signal to be measured are displayed virtually as they occur. This is in clear distinction from the usual type of digital display meter which, because of the need to count up from zero for each reading (in order to avoid accumulation of counting error) must be arranged to interrotate the unknown signal either repetitively or upon demand. The ballistic limitations is not a serious one since such devices may readily be made to respond to changes as rapidly as a human operator can comprehend the significance of a change.

For electrical measurements, normal full scale sensitivities can be expected as for analog meters with pointer-and-scale presentation. However, the ballistic burden upon the moving system is even less with this optical translator than when a conventional pointer is employed and an enhancement of meter performance can be anticipated. Nonlinearity in the deflection response of the movement can be compensated by varying the (horizontal) spacing of the code elements printed on the arc-shaped mirror. Also, within the limits of optical resolution, radically non-linear responses (e.g. logarithmic, square-law, etc.) may be accommodated by the coding pattern and displayed digitally.

Adaptation of this system to non-electrical measurements (e.g. pressure etc.) can be achieved by substituting an appropriate transducer in place of the d'Arsonval meter movement. The remainder of the optical translating system and digital readout will remain as described.

For electrical measurement where a relatively high degree of sensitivity is required, a digital meter using a d'Arsonval movement as the primary transducer has the very important advantage of providing a very high rejection of common-mode interfering signals. Common-mode interfering signals are voltages appearing between ground (or other reference level) and both of the conductors conveying a signal to be measured. A typical example of this condition arises from electrical leakage in an electrically operated furnace when this leakage affects a thermocouple being used to measure the furnace temperature. Under these conditions, both thermocouple leads may have a substantial alternating potential with respect to ground whereas the desired signal may amount to only a few millivolts between the two leads. A measuring system having electronic amplifiers at its input may require special circuit precautions to enable it to ignore or reject the common-mode interference whereas the d'Arsonval movement is inherently unaffected by common-mode signals. In the digital measuring system described above, rejection of common-made interfering signals will be virtually infinite up to very high voltages and without any unusual precautions.

There exists a wide choice of codes which satisfy the requirements of the instant invention. One of the simplest in principle is the elementary step-decade code shown in FIG. 5. Horizontally, this code is drawn with a number of vertical increments 41 equal to the total numerical value of the end scale which it is desired to read. In the drawing, the areas 40 are shaded and non-reflecting, and the areas 42 are reflecting.

The photoelectric translator "sees" one small element 41 at a time and a single photocell receives the "units" information which increases in a series of steps from 0–9, thereafter repeating as often as necessary. The photocell responds by delivering an electrical signal proportional to the unshaded area of the printed code. Simultaneously, the "tens" information is read by a second photocell responding to a code which is similar to the "units" band but is drawn to ten times the horizontal scale. More bands and photocells can be used to translate "hundreds," "thousands," etc.

Although this code has the advantage of requiring only one photocell (and related circuit) per digit in the readout, the fact that it is effectively an analog-responding system makes it very vulnerable to variations in the birghtness of the source of illumination. If the numeral "8" were being translated, for example, a change in brilliance of approximately 12 percent could make the display show either "7" or "9." The minimium precaution would be the use of an additional clear band in the code working with an additional photocell to provide feedback to maintain a constant level of illumination. Regard must also be paid to the variation of characteristics of the photoelectric and other components to temperature variation and suitable compensation would be necessary.

All codes which achieve simultaneous translation of "units," "tens," "hundreds," etc., demand exact register of the projected pattern with the photocells which read it. This is necessary to avoid anomalous readout at decimal transfers. This can be appreciated by considering the system of FIG. 6. When attempting a readout of the numeral "10" with this code pattern, "skew" in the register could cause the readout to become "19" or "00" or "11" or "09." Use must be made of some means, such as the "units" band in the code, or of a supplementary band, to provide correction of register in the manner described relative to FIG. 3 or 4.

The BC.D code (binary-coded decimal) is preferred to the simple step-decade of FIG. 5. As noted, the BC.D requires four photocells per digit in the display but, because of its binary character, requires only that the photocells distinguish between darkness and light rather than discrete levels of illumination. The code in the 8421 form can be written:

|   | Decimal | | | | | | | | | |
|---|---|---|---|---|---|---|---|---|---|---|
|   | 0 | 1 | 2 | 3 | 4 | 5 | 6 | 7 | 8 | 9 |
| 8 |   |   |   |   |   |   |   |   | x | x |
| 4 |   |   |   |   | x | x | x | x |   |   |
| 2 |   |   | x | x |   |   | x | x |   |   |
| 1 |   | x |   | x |   | x |   | x |   | x |

The symbol "x" denotes that the numerical value for the code band in which it occurs is to be counted. The numerals 0–9 are obtained by selective counting of the band numerical values (8, 4, 2 or 1) in the code columns. Decoding of such a code demands only the presence (or absence) of a signal and does not rely critically on the magnitude of the signals.

A detail of BC.D 8421 code is shown at the left of FIG. 6. A total of ten bands is illustrated, the lowest group 44 of four bands containing the units information 0–9 repeated as often as necessary to match the required full-scale value. The next four bands 46 are drawn to ten times the horizontal scale and simultaneously convey the "tens" information for the readout; once again, the 0–9 pattern is repeated as needed to accumulate the end-scale value required. The upper two bands 48 provide the "hundreds" information from 0 to 3 (2+1) only since in this example an end-scale value of 399 was required (for a readout resolution of one part in 399 or 0.25 percent). An additional band 50 is included for correction of register of the image projected on the photocell matrix.

Numerous variations of binary codes may be devised, some of which may be relatively more efficient for particular applications. The final choice must take account of all component characteristics in the system. In the typical case, the numerals 0–9 in decimal notation require four "bits" in the code and a corresponding four photocells for reading. Some economy might be derived from using the full capacity of the BC.D 8421 code (0 to 15) but only at the expense of rather more complex switching between the photocell matrix and the digital display devices.

Variations upon otherwise conventional code patterns may be employed to suit mechanical convenience elsewhere in the system. Thus the arrangement of photocells in the matrix might be staggered to provide a more convenient electrical or mechanical layout; complementary displacements may then be applied to the code bands to assure true readout. Codes may also be made for other than decimal notation, e.g. degrees, minutes, et cetera for angles.

FIG. 6 also shows a typical circuit diagram for a complete digital meter for measuring electrical quantities. The circuit is simplified in such respects as showing relays operated by the elements in the photocell matrix whereas reliable transistorized circuitry might be employed in practice. All principal circuit functions are included however.

Ten photocells 52 are provided and these will read one vertical group in the code bands 44, 46, 48 for a given deflection of the primary transducer 54. Where a reflective code element causes light to be projected upon its related photocell, the resistance of the latter will fall. The dark photocells will, on the other hand, be relatively non-conducting. The code pattern will thus be read by the photocell matrix in terms of conducting and non-conducting combinations of photocells 52. Each band in the code has a predetermined numerical significance which is transferred optically to the photocells.

Each photocell in the martix is connected to a relay 56 which will operate when the photocell is illuminated when operated, the relay contacts 58 connect appropriate digital display devices 59 to the regulated power supply 61 via resistors 62 each of which is proportioned in ohmic value to pass an amount of current proportional to the numerical significance of the related photocell and code band. Thus, if photocell No. 10 is illuminated, relay No. 10 operates to pass one unit of current via R10 from the regulated supply to the digital display device in the "units" position in the readout. Illumination of photocell No. 9 provides two units of current, No. 8 provides four units of current and No. 7 provides eight units of current. Simultaneous illumination of two more photocells in these four code bands will furnish the appropriate summations of current to the digital display device; if no cells in this group are illuminated, zero current will reach the display device. In this way, any "units" value from 0 to 9, as determined by the element of the printed code as projected on the photocell matrix, can be decoded to a numerical readout. A similar action translates the "tens" and "hundreds" information in the readout up to a maximum of 399 in the illustration given. The number of bands and digital display devices may be varied to obtain greater or less readout resolution. The buildup of the reading "203" illustrated in FIG. 6 will be apparent by inspection.

As noted, the coded pattern projected to the photocell matrix will not normally be in exact register and will be displaced laterally by a small amount corresponding with an imaginary significant figure beyond the significant figures in the readout. The rounding-off to the nearest display figure can be accomplished by the beam-displacing techniques described relative to FIGS. 3 and 4. Where a separate movement is employed to activate the beam-displacing plate or reflective component, a circuit arrangement such as is shown in FIG. 6 can be used.

With this arrangement, the additional code band 50 is employed for registration purposes. This band contains twice as many elements as the "1" band of the units code. A three terminal photogenerative cell 64 will read this register code band and will apply a deflecting current to the register-correcting transducer 66 so as to center the pattern reaching the main photocell matrix. The proportion of reflecting and non-reflecting areas read by the cell 64 will determine the magnitude of the deflecting current. When the light beam is centered, an equal proportion will be read and zero deflecting current will be sent.

Any failure of the code pattern to register exactly on the photocell matrix (due to "run-out" in the primary transducer, for example) can be corrected by a system similar to that described but installed with its axis at right angles to that of the primary transducer. The appropriate "code pattern" for this correction will be a simple continuous parallel line along the arc-shaped mirror.

Where a digital meter system of the type described is to be adapted for multiple ranges (by means of multiplier resistors, shunts, etc.), switching circuits will be employed to select ranges. By the use of suitable elements in the code printed on the arc-shaped mirror, signals may be generated which will, in turn, control the selection of operating range. Thus, the digital multimeter might normally revert to its highest operating range. Upon the application of an unknown signal significantly below this maximum range value (e.g. less than 10 percent of full scale) a photoelectric translation could cause the meter to switch to the lower ranges successively until a readout about, say, 10 percent of full-scale was obtained. In this way the need for manual range changing would be obviated. A similar photoelectric technique could serve to disconnect the primary transducer in the event that an excessive (beyond full-scale) input were applied. The electronic circuitry to accomplish these functions would employ otherwise conventional techniques.

The optical components used in this system must satisfy normal optical laws in order to obtain the required image transfers and magnifications in a compact manner. Many useful variations may be made to satisfy particular embodiments of the basic principles. For example a semi-silvered mirror 22 is shown in FIG. 1 as a means of light input and output from the optical encoding part of the system. By suitable treatment of the optical paths, the light can be admitted by means of a very small mirror at this point, past which the projected image can emerge with very little attenuation. Alternatively, a rather large mirror can be used, with the emerging image being projected through a small hole in the mirror. Again, the ingoing and outcoming optical paths may be angularly divergent so that the reflecting surface 22 is completely clear of the projected beam; this latter arragement is convenient when the primary transducer is to operate through a relatively large angle.

The use of a d'Arsonval movement is particularly convenient in a system of the type described where correction of registry is a feature. Thus, the circuitry including the photoelectrically developed feedback can be conveniently associated with this type of movement. It will be obvious, however, that various types of primary transducers will be acceptable for use with or without the registration techniques described. It will also be apparent that the described system need not be employed in conjunction with an electrical movement since the system can be useful for detecting variations in other arrangements, for example angular deflections of a simple shaft.

That which is claimed is:

1. In a system for measuring variable conditions including movable means operating in response to variations in the conditions, the improvement in a display means for the system comprising a reflecting means operatively connected to said movable means whereby movements of the reflecting means take place in response to said variations, a light source directing a beam of light to said reflecting means, a coded mirror mounted in a stationary position relative to said reflecting means and located in a position beyond the reflecting means such that said beam is reflected to the mirror, said mirror carrying a plurality of individually different code patterns made up of reflecting and non-reflecting portions, the reflecting and non-reflecting portions of an individual code pattern being arranged in a line, said line being divided into a plurality of levels with each level being occupied by one of said portions, a plurality of such lines being arranged in side-by-side relationship over the face of said mirror, photosensitive means positioned in the path of said beam after the beam is reflected by reflecting portions of said mirror, said light beam being directed to all portions of a line whereby said photosensitive means simultaneously detects the reflected light from an entire line, and digital display means operatively connected to said photosensitive means, said digital display means operating to display values depending upon the nature of the beam reflected to said photosensitive means.

2. A system in accordance with claim 1 wherein the reflecting and non-reflecting means in said lines are arranged in accordance with a binary code system, said photosensitive means comprising an independent photosensitive element for each level on the face of said mirror.

3. A system in accordance with claim 1 wherein said reflecting and non-reflecting portions comprise a step type coded pattern wherein the area of reflecting portions of a given line changes in proportion to the value of digital changes, and wherein photosensitive means is adapted to detect the reflected light from a particular line, the digital display means associated with said one photosensitive means operating in accordance with the magnitude of light detected by the photosensitive means.

4. A system in accordance with claim 1 wherein a set of lines arranged in side-by-side relationship is located on one section of the face of said mirror, and wherein at least one additional set of said lines is located over a separate section of said face, said sets representing different decimal positions for the digital display.

5. A system in accordance with claim 1 wherein the light beam passing from said coded mirror travels a direction substantially the same path of the light beam passing to the coded mirror.

6. A system in accordance with claim 5 wherein said light source directs said beam to a first lens and including a semi-silvered mirror for diverting the beam issuing from said first lens, a second lens interposed between said first lens and the reflecting means connected to said movable means, said reflecting means being adapted to reflect the light passed from said coded mirror through said second lens and through said semisilvered mirror to a third lens, said third lens being adapted to direct said light to said photosensitive means.

7. A system in accordance with claim 1 including a power supply, a plurality of resistor elements adapted to be selectively included in a circuit between said power supply and said digital display means, said photosensitive means operating to control the inclusion of said resistors in said circuit for thereby controlling the operation of said display means.

8. A system in accordance with claim 1 including means for adjusting the position of the reflecting means connected to said movable means, said adjusting means operating to locate the beam of light directed to said coded mirror in substantially exact registry with said photosensitive means.

9. A system in accordance with claim 8 wherein said movable means is adapted to be moved in response to changes in electrical current, and wherein said means for adjusting said reflecting means comprises a feed back current fed to said movable means.

10. A system in accordance with claim 9 wherein said photosensitive means include means for detecting deviations in said light beam as a result of improper registry with a code pattern, the detecting of said deviations resulting in the production of said feed back current.

11. A system in accordance with claim 9 wherein a line of alternating reflecting and non-reflecting portions is carried by said mirror, said feed back current being developed in accordance with the proportion of reflecting and non-reflecting areas detected in said line.

12. A system in accordance with claim 11 wherein said line is formed on a separate section of said mirror face.

13. A system in accordance with claim 11 wherein said line comprises the No. 1 line in the units section of a binary code pattern displayed by said mirror face.

14. A system in accordance with claim 1 wherein said movable means comprises a d'Arsonval movement, and wherein said reflecting means is aligned with the axis of said movement.

References Cited

UNITED STATES PATENTS

| | | | |
|---|---|---|---|
| 2,659,072 | 11/1953 | Coales et al. | |
| 2,883,649 | 4/1959 | King | 324—97 |
| 2,948,890 | 8/1960 | Barth et al. | 340—190 X |
| 3,335,367 | 8/1967 | Skooglund et al. | 324—97 X |

DONALD J. YUSKO, Primary Examiner

C. MARMELSTEIN, Assistant Examiner

U.S. Cl. X.R.
324—97; 340—205